July 31, 1951  F. E. GRAY  2,562,546
TIMER

Filed Feb. 7, 1947  7 Sheets-Sheet 1

INVENTOR.
FLOYD E. GRAY
BY
HIS ATTORNEY

July 31, 1951 F. E. GRAY 2,562,546
TIMER
Filed Feb. 7, 1947 7 Sheets-Sheet 2

Fig.3.

INVENTOR.
FLOYD E. GRAY
BY
HIS ATTORNEY

July 31, 1951  F. E. GRAY  2,562,546
TIMER
Filed Feb. 7, 1947  7 Sheets-Sheet 5

INVENTOR.
FLOYD E. GRAY
BY
HIS ATTORNEY

July 31, 1951  F. E. GRAY  2,562,546
TIMER
Filed Feb. 7, 1947  7 Sheets-Sheet 6

INVENTOR
FLOYD E. GRAY
BY
HIS ATTORNEY

Fig.11.

Patented July 31, 1951

2,562,546

UNITED STATES PATENT OFFICE 2,562,546

TIMER

Floyd E. Gray, Dayton, Ohio

Application February 7, 1947, Serial No. 727,205

3 Claims. (Cl. 161—1)

The invention relates to timers in which an electric motor drives certain elements through gear trains at a uniform rate of speed and is arranged to operate signals.

One of the objects of my invention therefor is to provide a device in which the driven elements may be preset to measure the length of any predetermined period of time and in which the driven elements, at the end of such time, operate a signal.

Another object of my invention is to provide means for stopping the motor at the end of the predetermined length of time.

A further object of the invention is to provide means whereby at the end of the predetermined length of time it is possible to disconnect the current from the signals by a manual switch; the motor, the source of electricity, the switch, the connections, and the signal means being so arranged, however, that if thereafter the device is again preset for a timing operating without again operating said manual switch, the signals will inform the user of the necessity of again operating said switch.

A further object of my invention is to provide means which may be operated, if desired, to keep the signalling means in operation for a predetermined length of time and to stop the operation of the motor and of the signals after the predetermined length of time has elapsed.

More specifically, it is an object of my invention to provide in combination an automatic switch and a pair of cams, each of the cams being formed with a portion and these portions co-acting with a cam follower in such fashion that the cam follower must be aligned with the portions in order to have the automatic switch move in one direction and so arranged that if either of the portions is moved out of alignment with said cam follower, the automatic switch is moved by the nonaligned cam portions in the direction opposite to that referred to above.

A further feature of my invention is the provision of a pair of cams which are connected by an adjustable drive connection or coupling in the form of a detent mechanism with driving means therefor. This feature provides for setting one cam independently of the other so that the angular relationship between the cams can be maintained such that the cams come into exact alignment at a predetermined time as they engage the cam follower.

Further objects and advantages of the present invention will be apparent from the following description, reference being had to the accompanying drawings wherein preferred forms of embodiments of the invention is clearly shown.

Figure 1:
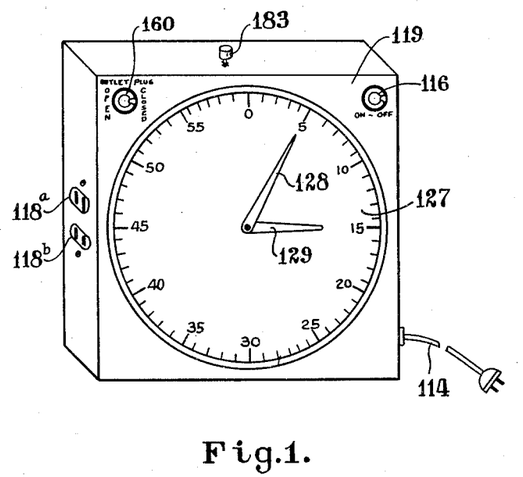
Fig. 1 is a view in perspective of a preferred embodiment of my invention.
Figure 2:
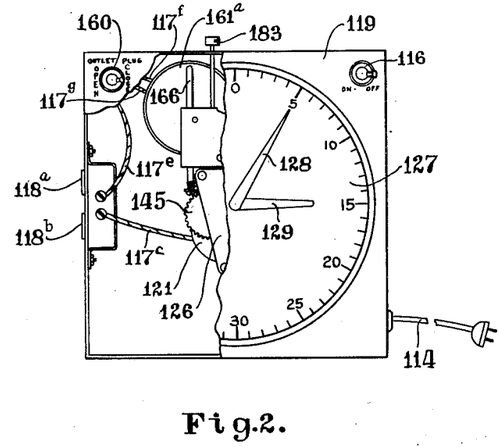
Fig. 2 is a view in elevation of the timer shown in Fig. 1 with a part of the front of the casing removed to show a portion of the interior construction thereof.
Figure 3:
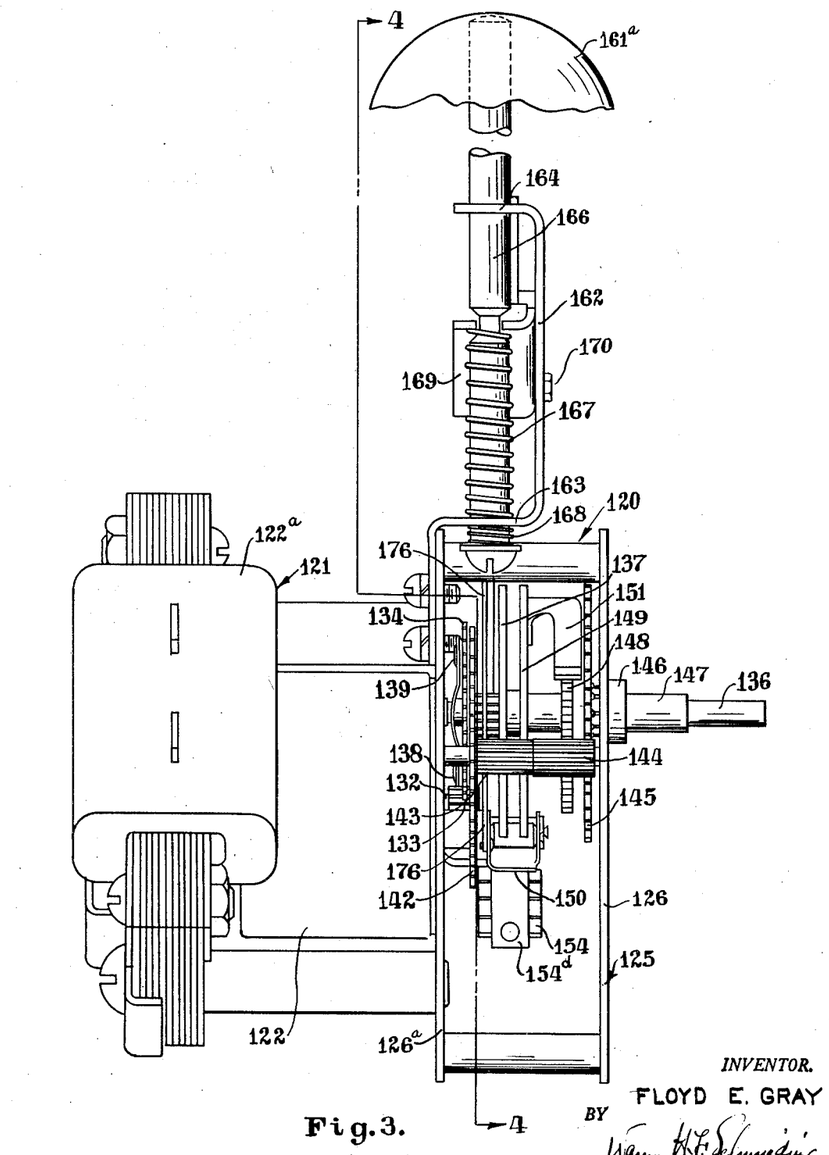
Fig. 3 is a fragmentary view in side elevation and on a larger scale showing the timer of Figs. 1 and 2 with the outer casing removed and looking at the timer as if from the left in Fig. 2.

Referring for a detailed description to the drawings and first to Figs. 1, 2, 3 and 6 it may be seen that I provide an input electric cord 114 leading from a source of electric power 115 to a switch 116 and thence to electrical wiring 117. The wiring 117 includes leads 117a, 117b, 117c, 117d, 117e, 117f and 117g. I also provide outlet sockets 118a and 118b for purposes later to be described. A casing 119 houses the timer mechanism which is generally designated as 120 (see Fig. 3). The timer mechanism 120 includes an electric motor 121 (the full details of which are not shown) but which (as is shown in Fig. 3) consists of a rotor unit 122 and a field and coil assembly 122a. The motor 121 is connected by wires 123 and 124 (Fig. 6) to appropriate portions of the electrical wiring 117. The timer mechanism 120 also includes a timer gear and cam mechanism generally designated as 125 (Fig. 3) and including a front gear plate 126 and a rear gear plate 126a. A clock face 127 (Figs. 1 and 2) provided with hands 128 and 129 is secured to the front of the casing 119.

Figure 5:
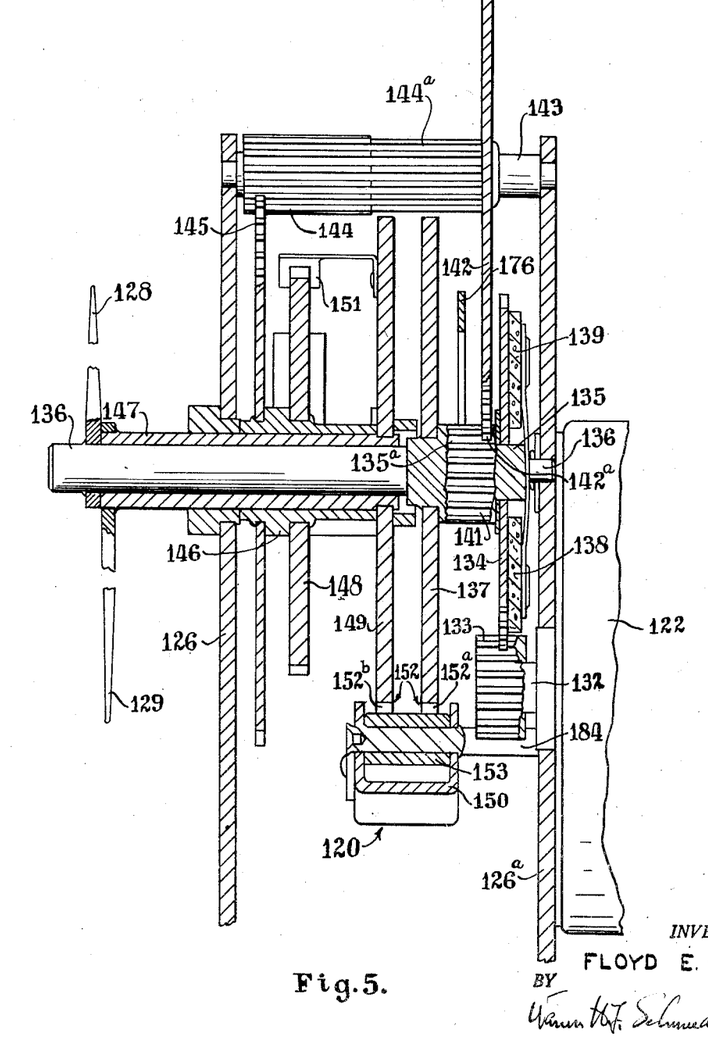
Fig. 5 is a fragmentary sectional view of the timer of Figs. 1 to 4, inclusive, shown on a still larger scale and showing the details of the cam and the driving connections between the cams and the motor of the preferred embodiment of my invention, the section being taken as if on the line 5—5 of Fig. 4 and looking in the direction of the arrows.

The rotor 122 (Figs. 3 and 5) drives a shaft 132 which is provided as is shown most clearly in Fig. 5 with a pinion 133 that meshes with a gear wheel 134 rotatably mounted on a hub 135. The hub is integral with a shaft 136. Friction clutch members 138 and 139 are secured to the shaft 136 and bear on one side of the gear wheel 134. The shaft 136 has secured to its front end a second hand 128. The hub 135 has a cam disk 137 secured thereto.

A pinion 135a having gear teeth 141 is formed on the hub 135 and meshes with teeth 142a carried by a gear wheel 142. The pinion 135a thus drives the gear wheel 142 which is in turn secured to a shaft 143. The shaft 143 is rotatably mounted in the front and rear gear plates 126 and 126a. The shaft 143 has teeth 144 formed thereon which mesh with and drive a gear wheel 145. The teeth 144 are reduced as at 144a to clear the cam disks 137 and 149. The gear wheel 145 and an associated ratchet wheel 148 are secured to a sleeve 146. The sleeve 146 is free to rotate on another smaller sleeve 147 which surrounds the shaft 136 and has a minute hand 129 attached thereto. Associated with the ratchet wheel 148 is the cam disk 149 which is secured to the sleeve 147 and is at times driven by a ratchet wheel 148 through a pawl device 151. The ratchet and pawl thus provide an adjustable drive connection between the two timer cams whereby one cam can be set independently of the other. With this mechanism the angular relationship between the two cams can be maintained so that the cams will come into exact alignment at a predetermined time as they rotate into engagement with the cam follower 153. To maintain the synchronism between the cams, the ratchet wheel 148 is provided with a number of teeth equal to the gear reduction between the cams. Thus, for example, when the minute hand is set by turning it partially around the dial, the ratchet and pawl mechanism insures that the angle to which the hand is turned will exactly represent an integral number of revolutions on the second cam.

The cams consisting of the cam disks 137 and 149 are provided with cam follower actuating portions herein shown as notches 152 (the notch in disk 137 being individually designated as 152a and the notch in disk 149 being individually designated as 152b) into which at times a cam follower or roller 153 (see Figs. 4 and 5) rides. When the notches 152a and 152b of the cam disks 137 and 149 are in alignment with the cam follower 153, the follower will enter the notches 152a and 152b (See Fig. 4). This will cause a rocker arm 150 (on which the roller 153 is mounted) to operate the automatic switch 154 as follows: As the follower 153 enters the notches 152 it allows arm 150 to be moved slightly upward and thus relieving its pressure on the link 154d; this allows the resilient contact member 154a to move upward toward member 154c to close the contacts 155 and 156 and to open the contacts 157 and 158; movement of either of the disks 137 or 149 from the position shown in Fig. 4, so that the cam follower 153 no longer remains in notches 152a and 152b, will bring the outer end of the rocker arm 150 down again and thereby move the contact member 154a downward toward the member 154b to close the contacts 157 and 158 and open the contacts 155 and 156.

Figure 6:
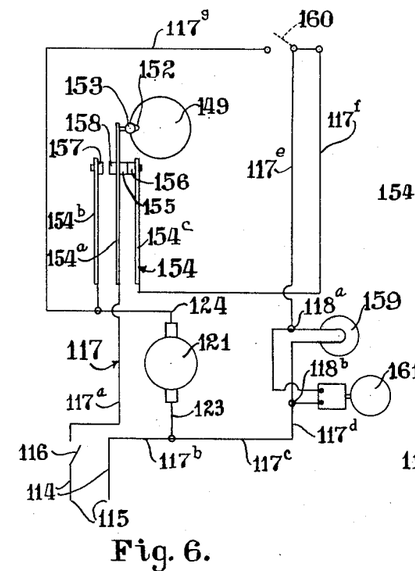
Fig. 6 is a diagrammatic view of the electrical connections in the position of the parts after the timer has been set for the measurement of a predetermined length of time and after the predetermined length of time has elapsed.
Figure 7:
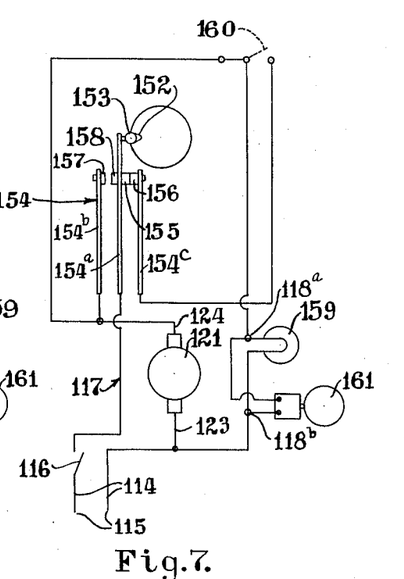
Fig. 7 is a diagrammatic view similar to Fig. 6, showing the position of the parts after the predetermined length of time has elapsed and after the signal has been turned off by the manual switch.
Figure 8:
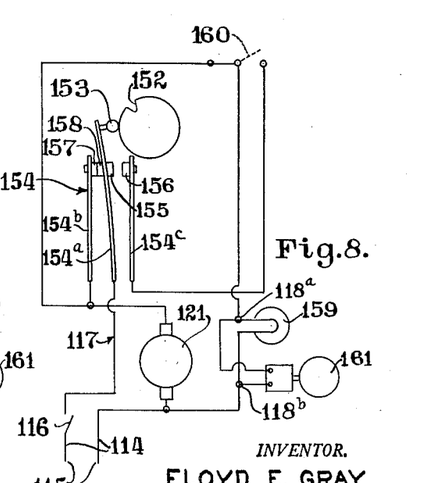
Fig. 8 is a diagrammatic view similar to Fig. 6, showing the position of the switches and other parts when the device has been operated to preset a new timing interval without moving the manual switch to the usual timing position.
Figure 9:
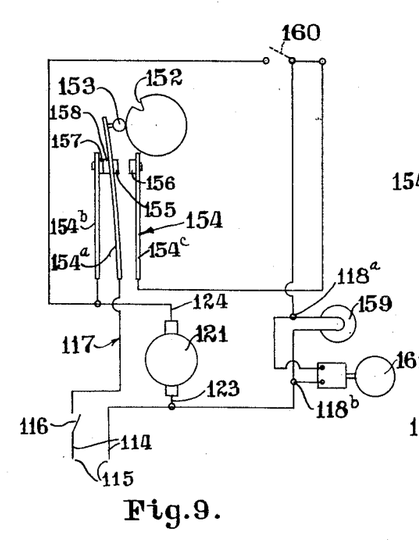
Fig. 9 is a diagrammatic view similar to Fig. 6 showing the position of the parts after the timer has been set for the measurement of a predetermined length of time and after the manual switch has been moved to the usual timing position but before the predetermined length of time has elapsed.
Figure 10:
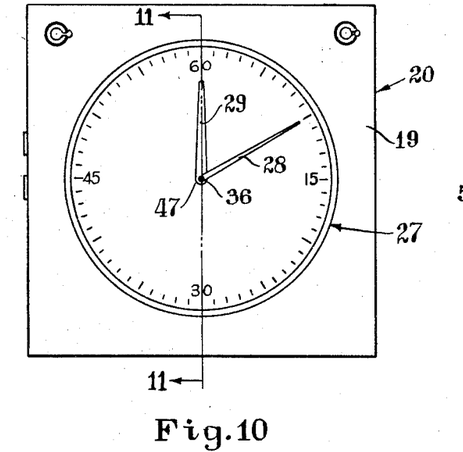
Fig. 10 is a view in front elevation of another embodiment of my invention which is also shown for purposes of illustration thereof.

The electrical circuit diagrams, shown in Figs. 6 to 9, inclusive, show the various operating conditions of the motor and signalling means. Fig. 9 shows the timer set for the measurement of a predetermined length of time but before the predetermined length of time has elapsed. The contacts 157 and 158 are closed and the switch 160 is positioned to the right. Under these conditions, the motor 121 is in operation while the signalling means (the light 159 and the bell 161) are off or inoperative. After the predetermined length of time has elapsed, the notches 152 of cam disks 137 and 149 will have moved into alignment with the cam follower 153 as shown in Fig. 6. The contacts 155 and 156 will then be closed and the contacts 157 and 158 will be open. When the timing mechanism has been moved to the position shown in Fig. 6, the motor 121 is inoperative and the signalling means (the light 159 and the bell 161) are in operation. In the event further timing operations are contemplated, the hands 128 and 129 are reset. This moves the cams 137 and 149 and moves the automatic switch 154 so that the contacts 155 and 156 are separated and the contacts 157 and 158 are closed. Thus the condition of Fig. 9 again prevails and the timing operation may be repeated.

In the event, however, that no further timing operations are immediately contemplated, the switch 160 is moved to the open or "off" position as seen in Fig. 7. This shuts off the signalling means and maintains the motor inoperative. Should now the hands of the timer be set to measure any desired time, the switch 160 should again be closed. However, should the operator fail to move the switch 160, the signals will remain in operation and warn him of his failure as indicated in Fig. 8. Moreover, should for any reason it be desired to have the signalling means on for a predetermined length of time, the switch 160 may be moved to the left, as in Fig. 8 or if it is already to the left as shown in Fig. 7, it may be allowed to remain there. The timer may be set for a predetermined length of time. In such case, the contacts 157 and 158 will be closed and contacts 155 and 156 will be open. Under these conditions, the motor 121 and signalling means will all be in operation. When the predetermined length of time has elapsed, the motor 121 and the signalling means all become inoperative as shown in Fig. 7.

Means are provided for the operation of a second or auxiliary bell 161a by mechanical means. A signal bracket plate 162, shown in Fig. 4, has integral end walls 163 and 164 which have aligned circular openings 165 for the reception of a bell plunger 166. The bell plunger 166 is provided with a relatively long actuating compression spring 167 and with a relatively shorter shock absorber spring 168. A detent arm 169 straddles and thus controls movement of the bell plunger 166. The spring 167 is positioned between the arm 169 and the wall 163 thus urging the arm 169 upward. A stud 170 secured to the bracket plate 162 is provided as a pivot for detent arm 169; and the arm 169 also carries a roller 171 having an operating surface 172. Also attached to the signal bracket plate 162 by a stud 173 is a detent plate 174 having a retaining spring 175. Also connected to the detent plate 174 by means of a pin 177 is an adjustable link 176. This adjustable link 176 comprises parts 176a and 176b. Part 176b is formed with a screw 178 and part 176a is formed with a slot 179, the screw and slot forming an adjustment means for varying the length of the link 176. The pin 177 rides in a slot 180 formed in the detent plate 174 and is thus connected to the plate. It is also connected at its lower end as at 185 to the outer end of the arm 150 and through the arm 150 to the cam follower 153. The arm 150 is pivotally supported at its inner end on a stud 184. At the top of the mechanism, a plunger 183 is provided which is used when it is desired to compress the spring 167 and to move the arm 169 from the position shown in full lines (Fig. 4) to the dotted line (or preset) position thereof (also shown in Fig. 4).

Figure 4:
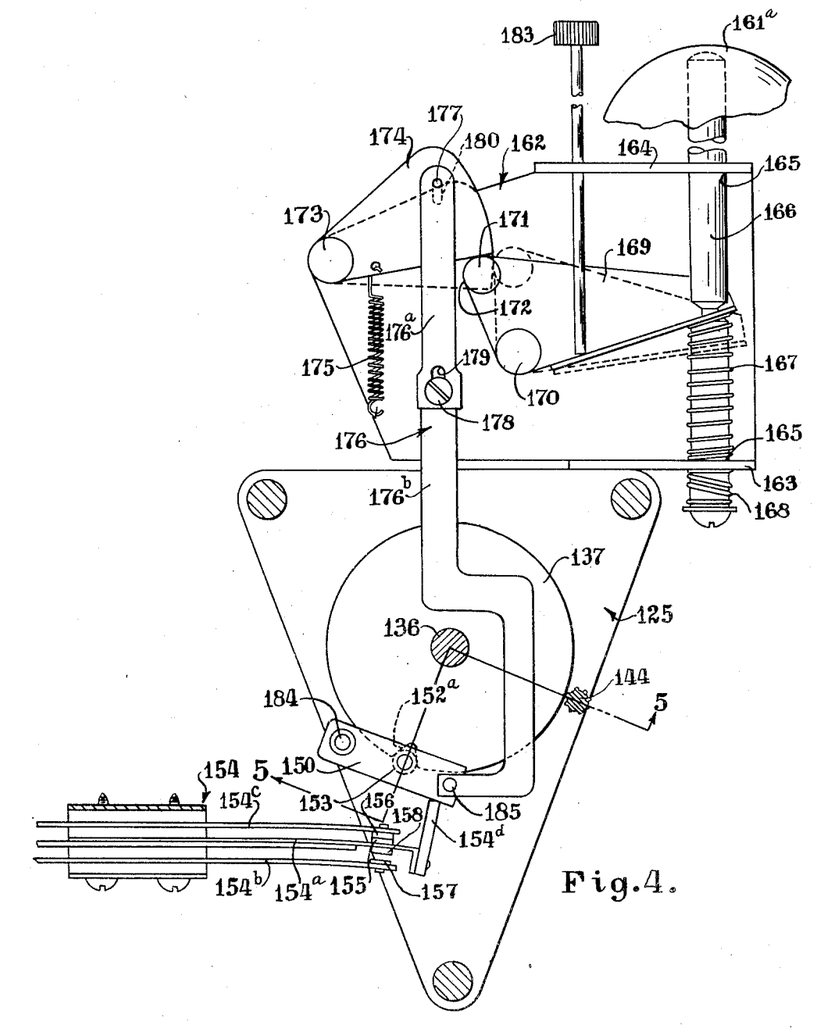
Fig. 4 is a view partially in rear elevation and partially in section, also on a larger scale, and showing the signal bracket assembly, the automatic switch assembly, and the attachment of both to the gear assembly, the view being taken substantially as if on the line 4—4 of Fig. 3.

The adjustable link 176 and the link 154d shown in Fig. 4, are both operatively associated with the arm 150, the link 176 being secured thereto by the stud 185 and the link 154d bearing thereon. The arm 150 constitutes a motion multiplying device and causes a larger movement of the links 176 and 154d than the relatively small movement of the roller 153 as it is raised from the notches 152a and 152b by the cams 137 and 149. It may be here noted that the link 154d is resiliently held in contact with the rocker arm 150 by the spring contact member 154a.

In detailing the operation of the device illustrated in Figs. 1 to 9, inclusive, I will first refer to the condition of the device in which the timer is preset for a predetermined length of time and the signal means is maintained inoperative with the switch 160 in the closed or "on" position as in Fig. 9. After the device is so preset, so that the follower 153 is out of the notches 152a and 152b, the rotor 122 drives the shaft 132 and through the pinion 133 drives the gear wheel 134. The gear wheel 134 through the friction devices 138 and 139 drives the shaft 136, the cam 137, and the second hand 128 attached to the shaft 136. Inasmuch as the hub 135 is secured to the shaft 136, and is formed with gear teeth 141 which mesh with gear wheel 142, the gear wheel 142 is driven thereby. The gear wheel 142 rotates the shaft 143 and drives the gear wheel 145. The gear wheel 145 rotates the sleeve 146 and the ratchet wheel 148. The ratchet wheel 148 through the pawl 151 rotates the cam 149 and the sleeve 147 to which the minute hand 129 is attached. When the cams 137 and 149 simultaneously reach a registering position in which the follower 153 may enter the notches 152a and 152b, the resilient contact member 154a springs to the position shown in Fig. 4 so that the contacts 157 and 158 are separated and the contacts 155 and 156 are joined and (see Fig. 6) so that the motor is stopped and the electric signals are operated. In so doing the resilient contact 154a moves the link 154d and through the arm 150, the adjustable link 176. The detent plate 174 is thus moved and releases the arm 169 so that the plunger 166 is driven against the bell 161a by the spring 167.

The operation of the signals 159, 161 and/or 161a warn the operator to perform whatever necessary operation is being controlled. Thereafter he shuts off the signals 159 and 161 by moving the switch 116, or if desired, again presetting the timer by moving the hands 128 and 129 and with them the cams 137 and 139 so that the parts are again in the position shown in Fig. 9. Also after the bell 161a has been operated mechanically it is often desirable to again reset the mechanical bell mechanism. The minute and second hands are rotated thus removing the cam follower 153 from the notches 152a and 152b and the adjustable link 176 is thus moved downward from the position shown in Fig. 4. The pin 177 slides in the slot 180. The plunger 183 may then be operated manually to rotate the lever 169 about its pivot 170 to the dotted line position shown in Fig. 4. This compresses the spring 167 and moves the bell plunger 166 out of contact with the bell. The roller 171 rolls out from under the lower surface of the detent plate 174 and the spring 175 draws the plate 174 to the dotted line position thus forming a latch against the arm 169 and preventing the spring 167 from driving the plunger 166 against the bell 161a.

However, the timer may be set without setting the mechanical bell mechanism. The cams 137 and 149 may be rotated by movement of the hands 128 and 129 and the cam follower 153 is thus removed from the notches 152a and 152b without moving the plunger 166. This action is made possible by the slot 180 provided in the detent plate 174 which allows the pin 177 to move downwardly therein. In such case subsequent driving of the cam disks 137 and 149 will move those disks to a position in which the roller 153 enters the notches 152a and 152b with the result that the motor will be again stopped and the electrically operated bell 159 and light 161 will be operated as indicated in Fig. 6. The signals may be stopped and the motor maintained inoperative by moving the manual switch 160 to an open or "off" position as in Fig. 7. If the timing mechanism is thereafter reset, as in Fig. 8, without moving the manual switch 160 to the closed or "on" position i. e., to the right the signals 159 and 161 become operative to indicate that condition.

Referring now to the second embodiment of my invention shown in Figs. 10 to 13, inclusive, it may be seen that I have shown a timer 20. This timer 20 consists of a synchronous electrical motor 21, the details of which are not shown in the drawings, the driving mechanism being enclosed in a casing 22 and operated by an electric current connected thereto by the electrical leads 23 and 24; and a timer gear and cam mechanism assembly 25 which together with the motor 21 are housed and carried in a casing 19. The assembly 25 includes front and rear gear plates 26 and 26a which support the gear trains. A clock face 27 is mounted on the front of the casing 19.

Figure 11:
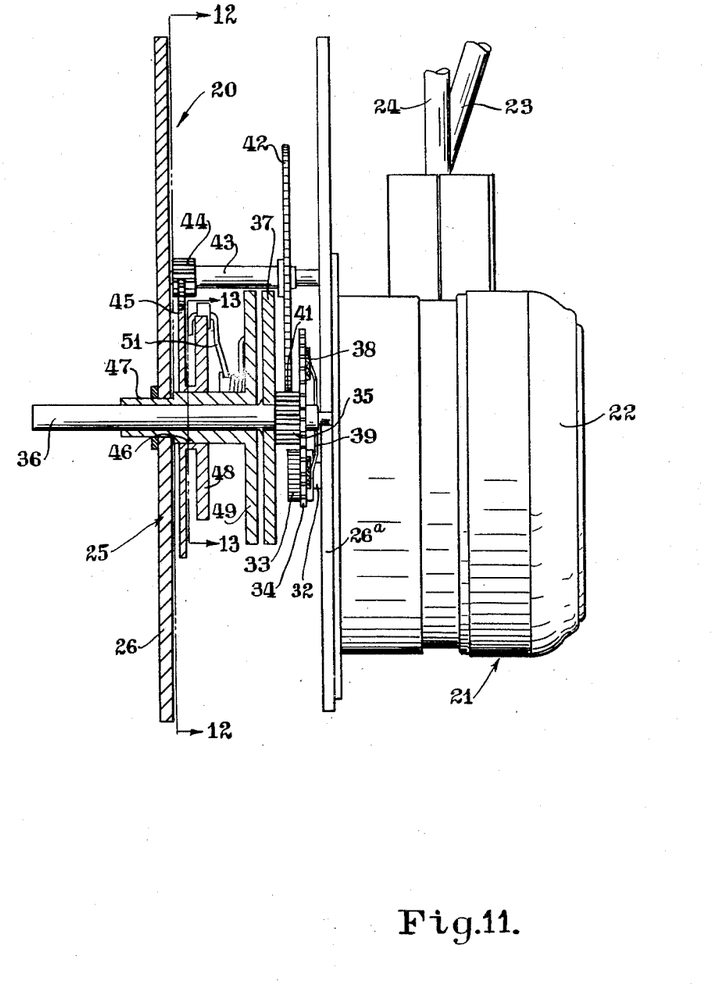
Fig. 11 is a view partly in side elevation but having portions broken away and portions shown in vertical section as if taken on the line 11—11 of Fig. 10, illustrating the structure shown in Fig. 10 on a larger scale and showing the details of the cams, and the driving connections between the cams and the motor.

Referring especially to Fig. 11, I have shown the electric motor 21, contained within the casing 22, driving a shaft 32 which is provided with a pinion 33. The pinion 33 meshes with a gear wheel 34 which is formed integral with a hub 35. The hub 35 is mounted for rotation on a shaft 36. Frictional clutch members 38 and 39 are secured to the shaft 36 and bear on one side of the gear wheel 34. The shaft 36 has secured to its end the second hand 28. (See Fig. 10.) It also has a cam disk 37 secured thereto.

Gear teeth 41 are formed on the hub 35 and they in turn mesh with and drive a gear wheel 42. The gear wheel 42 is secured to a shaft 43. The shaft 43 has a pinion 44 provided thereon which meshes with and drives a gear wheel 45. The gear wheel 45 is formed integral with a ratchet wheel 48 and the unit comprising the wheel 45 and the wheel 48 is rotatably mounted as at 46 on a minute sleeve or shaft 47. The sleeve 47 has the minute hand 29 attached thereto (see Fig. 10). Adjacent to the ratchet wheel 48 is a cam disk 49 which is integral with the sleeve 47 and is at times driven by the ratchet wheel 48 through the pawl or friction device 51.

Figure 12:
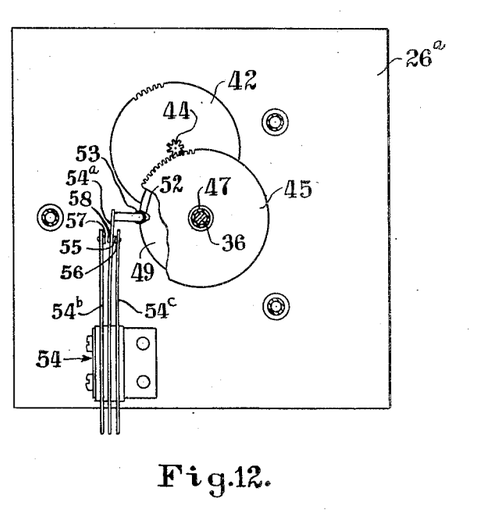
Fig. 12 is a view partially in elevation and partially in section and on a reduced scale, the view being taken inside the front cover as if substantially on the line 12—12 of Fig. 11, with, however, portions of a gear wheel and a ratchet wheel broken away.
Figure 13:
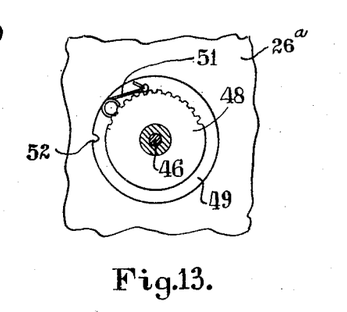
Fig. 13 is a fragmentary view in vertical section and also on a reduced scale, the section being taken substantially as if on the line 13—13 of Fig. 11.

The cams which consist of the cam disks 37 and 49 (previously referred to) are each provided with notches like the notch 52 (shown in disk 49 in Figs. 12 and 13) into which at times a cam follower 53 of the switch device 54 rides. When the notches 52 of the disks 37 and 49 are in alignment with the cam follower 53, the follower 53 enters the notches 52, as is shown in Fig. 12. The switch device 54 comprises a central spring conductor 54a, an outer spring conductor 54b and an inner spring conductor 54c. The central spring conductor 54a carries contacts 55 and 58. The outer spring conductor 54b carries a contact 57. The inner spring conductor 54c carries a contact 56. The cam follower 53 is also carried by the central spring conductor 54a. When the alignment (referred to above) occurs, the switch device 54 is moved so that the contacts 55 and 56 are closed and contacts 57 and 58 are open. A movement of either of the disks 37 or 49 so that the cam follower 53 no longer is in alignment with both of the notches 52 will result in the contacts 55 and 56 being opened and the contacts 57 and 58 being closed. The closing of the contacts 55 and 56 creates an electrical circuit similar to that shown in Fig. 6 which operates a light signal and/or a bell signal.

In describing the operation of the device of Figs. 10–13, inclusive, let us assume the condition of the device in which the timer is preset for a predetermined length of time and the signal means is maintained inoperative. The synchronous electric motor 21 then drives a shaft 32 and the pinion 33 thereon. Pinion 33 drives the gear wheel 34 which in turn drives the shaft 36 and the cam or disk 37. The pinion 41 integral with the wheel 34 drives the gear wheel 42 and the pinion 44 which drives the gear wheel 45 and the integral ratchet wheel 48. The wheel 48 in turn drives the cam or disk 49 by means of the friction device 51. The members 45, 48 and 49 thus at such times rotate with the sleeve 47.

Cam 37, being on the second shaft 36, rotates at a greater speed than the cam 49, but the speeds are proportional. When the predetermined time length has elapsed, the notches 52 of cams 37 and 49 become aligned with each other and with the cam follower 53 so that the follower 53 enters the notches 52. The signalling means are thus operated and the motor 21 is stopped.

I have herein provided a timing mechanism in which the driven elements may be preset to measure the length of any predetermined length of time and in which the driven elements at the end of such time will stop the motor and operate a signal. The signals may be turned off without starting the motor if desired. The parts may be again reset to indicate the passing of a desired interval of time. However, if this is done without positioning the manual switch in the desired setting, the signals will indicate this necessity. The time mechanism can also be so set that the signalling means will be in operation for a predetermined length of time after which time the motor and the signalling means will be inoperative.

While the form of embodiments of the present invention as herein disclosed constitute preferred forms, it is to be understood that other forms might be adopted, all coming within the scope of the claims which follow.

I claim:

1. In a timing device, in combination, a shaft; an indicating hand on the end of the shaft; a sleeve journaled on the shaft; an indicating hand on the end of the sleeve adjacent the first mentioned hand; a rotatable element secured to the sleeve and rotatable therewith; a motor; driving gearing between the motor and the shaft and sleeve for effecting synchronized movements of the shaft and sleeve at relatively different rates of speed of rotation, said driving gearing including a sleeve journaled on the first mentioned sleeve, a gear secured to the second mentioned sleeve for rotating the latter, a rotating element secured to the second mentioned sleeve and rotated by the latter, one of said elements being a ratchet gear and the other of said elements being a cam, and a spring pressed pawl secured to the cam element and yieldably engaged between the teeth of the ratchet gear element; and indicating mechanism actuated by the cam.

2. In a timing device, in combination, a shaft; an indicating hand on the end of the shaft; a sleeve journaled on the shaft; an indicating hand on the end of the sleeve adjacent the first mentioned hand; a cam secured to the sleeve and rotatable therewith; a motor; driving gearing between the motor and the shaft and sleeve for effecting synchronized movements of the shaft and sleeve at relatively different rates of speed of rotation, said driving gearing including a ratchet wheel sleeve journaled on the first mentioned sleeve, a gear secured to the ratchet wheel sleeve for rotating the latter, a ratchet wheel secured to ratchet wheel sleeve and rotated by the latter, and a spring pressed pawl secured to the cam and yieldably engaged between the teeth of the ratchet wheel; and indicating mechanism actuated by the cam.

3. In a timing device, in combination, a shaft; an indicating hand on the end of the shaft; a cam on the shaft and driven thereby; a sleeve journaled on the shaft; an indicating hand on the end of the sleeve adjacent the first mentioned hand; a rotatable element secured to the sleeve and rotatable therewith; a motor; driving gearing between the motor and the shaft and sleeve for effecting synchronized movements of the shaft and sleeve at relatively different rates of speed of rotation, said driving gearing including a sleeve journaled on the first mentioned sleeve, a gear secured to the second mentioned sleeve for rotating the latter, a rotating element secured to the second mentioned sleeve and rotated by the latter, one of said elements being a ratchet gear and the other of said elements being a cam, and a spring pressed pawl secured to the cam element and yieldably engaged between the teeth of the ratchet gear element, said cams being axially disposed side by side and having conforming camming surfaces; a cam follower bridging the camming surfaces; and indicating mechanism actuated by the cam follower.

FLOYD E. GRAY.

REFERENCES CITED

The following references are of record in the file of this patent:

UNITED STATES PATENTS

| Number | Name | Date |
|---|---|---|
| 2,202,721 | Anderson | May 28, 1940 |
| 2,459,107 | Johnson | Jan. 11, 1949 |
| 2,461,599 | Graef | Feb. 15, 1949 |

FOREIGN PATENTS

| Number | Country | Date |
|---|---|---|
| 181,354 | Switzerland | Mar. 2, 1936 |
| 453,892 | Germany | Dec. 22, 1927 |
| 592,442 | Germany | Feb. 7, 1934 |